United States Patent [19]

Wiechert

[11] 4,294,337

[45] Oct. 13, 1981

[54] BRAKING SYSTEM FOR A TRANSPORT CAR FOR TRANSPORTING FILES

[75] Inventor: Edelbert Wiechert, Berlin, Fed. Rep. of Germany

[73] Assignee: Siemens Aktiengesellschaft, Berlin & Munich, Fed. Rep. of Germany

[21] Appl. No.: 74,990

[22] Filed: Sep. 13, 1979

[30] Foreign Application Priority Data

Sep. 27, 1978 [DE] Fed. Rep. of Germany ....... 2842558

[51] Int. Cl.³ .............................................. B61H 5/00
[52] U.S. Cl. ..................................... 188/171; 104/50; 188/72.3
[58] Field of Search ...................... 188/72.3, 171, 173, 188/216, 206 R; 104/50, 129; 246/85

[56] References Cited

U.S. PATENT DOCUMENTS

| | | | |
|---|---|---|---|
| 3,598,203 | 8/1971 | Donaldson | 188/171 |
| 3,605,958 | 9/1971 | McCarthy | 188/171 |
| 3,636,883 | 1/1972 | Wesener | 104/50 |

FOREIGN PATENT DOCUMENTS 1563975  1/1972  Fed. Rep. of Germany .

*Primary Examiner*—Douglas C. Butler
*Attorney, Agent, or Firm*—Hill, Van Santen, Steadman, Chiara & Simpson

[57] ABSTRACT

In an exemplary embodiment, a brake disc is fixed to a motor shaft and a movable counter disc is withdrawn from the brake disc by an electromagnet against the force of a spring device. The spring device is laid out unsymmetrically in such manner that, in a first phase of the withdrawal, the counter disc is more strongly withdrawn from the brake disc in the area of lower spring forces. The braking system is employed as a parking brake supplementing the standard short circuit braking for transport cars traveling on profile rails and employed for transporting files.

4 Claims, 3 Drawing Figures

U.S. Patent   Oct. 13, 1981   4,294,337
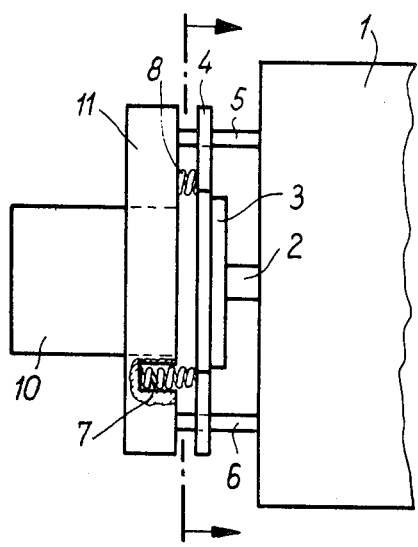
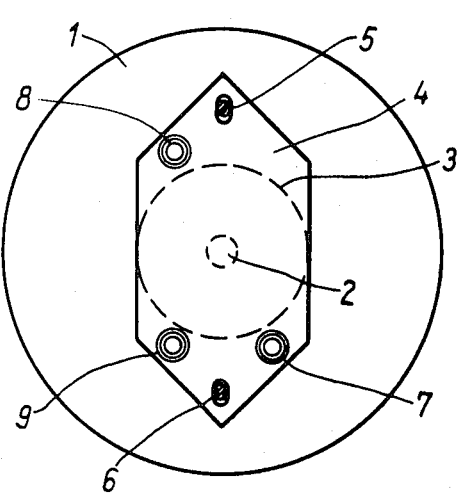
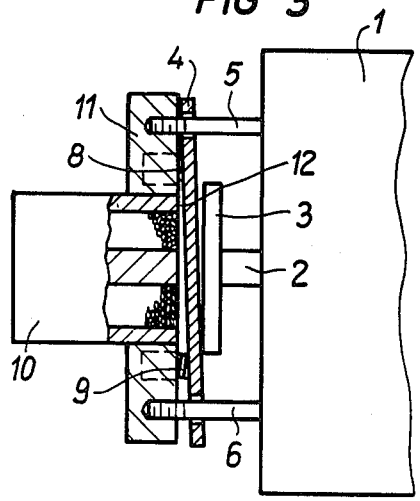

BRAKING SYSTEM FOR A TRANSPORT CAR FOR TRANSPORTING FILES

BACKGROUND OF THE INVENTION

The invention relates to a braking system for a transport car for transporting files or goods of similar weight running on profile rails with driving rollers, equipped with a drive motor fed via wiper contacts from current paths designed on the profile rails, said braking system comprising a brake disc mounted on the motor shaft and secured against rotation relative thereto, and a counter disc aligned with the brake disc, the counter disc being withdrawn from engagement with the brake disc by means of an excited electromagnet against the force of a spring device during travel of the transport car.

The use of a drive motor for propelling a transport car along profile rails by means of driving rollers, where the drive motor receives energization via wiper contacts from current paths associated with the profile rails, is well known in the art. In this respect, reference might be made to the second and third FIGS. of U.S. Pat. No. 3,636,883 issued Jan. 25, 1972.

Such braking systems are generally provided as a supplement for short circuit braking systems of transport cars. A short circuit braking of the transport cars is to be viewed as expedient insofar as electrically driven vehicles with standard d.c. drive are accelerated by force of gravity upon downward travel on inclined rail sections in such manner that the d.c. drive changes into generator operation and, thus, the operating voltage adjacent to the current paths is increased. When a transport car is to be brought to a stop, then the short circuit braking is employed together with a switching off of the operating voltage adjacent to the current paths. In order to securely arrest the transport car in the stop position in vertical sections of the profile rails, a transport car thereby decelerated by means of short circuit braking until it stops, or respectively, until it nearly stops is arrested by means of a mechanical parking brake.

The counter disc employed in the framework of such an initially defined braking system is pressed against the brake disc by means of the spring device when the excitation of the electromagnet is switched off, whereby the spring device is arranged and dimensioned in such manner that it guarantees the immobilization of a transport car with maximum loading on the vertical profile rail section by means of the friction exerted on the brake disc. When a succeeding travel of the transport car is initiated, the electromagnet is excited and withdraws the counter disc from the brake disc. Thereby, the electromagnet must exhibit a greater attraction on the counter disc than the opposing force of the springs in the pressing position of the counter disc.

As is known, the force exerted by a magnet on a magnetizable body decreases exponentially with the size of the air gap between the magnet and this body. Tolerances conditioned by fabrication and operation, therefore, have a significant influence on the dimensioning of the electromagnet.

SUMMARY OF THE INVENTION

The object underlying the invention resides in guaranteeing the counter force required for overcoming the force of the spring device in the contact position of the counter disc with the brake disc, particularly this force as determined by the maximum allowable weight of a transport car, with an electromagnet which is as small as possible and, accordingly, exhibits minimum weight. This object is achieved in that the spring device is unsymmetrically laid out in its arrangement and/or dimensioning in such manner that, upon initiation of the magnet excitation in a first phase of the withdrawing of the counter disc, the counter disc is more strongly withdrawn in the area of lower spring forces.

It is to be viewed as essential for the invention that, by means of the unsymmetrical force configuration of the spring device, the counter disc in response to the attractive force of the electromagnet first responds in an area in which relatively low spring powers are effective, so that the air gap existing at this location between the magnet and the counter disc is strongly reduced, or, respectively, the counter disc comes to lie entirely against the magnet under certain conditions. By means of this reduction of the air gap in a partial area produced with only a small magnetic force, a significant reduction of the magnetic reluctance of the magnetic circuit proceeding over the magnet and the counter disc is produced so that a secure, complete attraction of the counter disc to the electromagnet ensues in a second phase following the first phase of the withdrawal. There thus ensues a significantly greater security for the total withdrawal of the counter disc from the brake disc than is possible in a conventional equipping of the braking system with symmetrically distributed spring power.

The unsymmetrical force configuration of the spring device can be particularly simply realized from a structural point of view in that the spring device is formed of at least three individual springs unsymmetrically distributed. Likewise, the spring device can also be formed of symmetrically distributed individual springs of which at least one exhibits a smaller spring constant than the remaining individual springs. In this spring device, thus, the necessary asymmetry in the distribution of the spring power over the area of the counter disc is produced by means of differing springs.

Insofar as the spring device is built of individual springs, it is to be viewed as advantageous that the individual springs are designed as helical springs. In all, an optimum of the distribution of the springs can be simply determined by means of empirical investigations.

In the following, an exemplary embodiment of the invention is described with reference to an accompanying sheet of drawing; and other objects, features and advantages will be apparent from this detailed disclosure and from the appended claims.

BRIEF DESCRIPTION OF THE DRAWING

FIG. 1 shows a side view of the braking system of a driven transport car;

FIG. 2 is a transverse sectional view taken along the section line indicated in FIG. 1; and FIG. 3 is a somewhat diagrammatic view similar to FIG. 1, but showing the position of the counter disc when the electromagnet is first energized, certain parts being shown in section to reveal details of construction.

DETAILED DESCRIPTION

A motor carries a brake disc 3 on its motor shaft 2 projecting from a motor housing 1. A counter disc 4 is allocated to the brake disc 3, said counter disc 4 being mounted for reciprocal movement on two pilot pins 5 and 6. Moreover, three helical springs 7, 8, 9 are applied to the counter disc 4, the seating and design of said springs being illustrated in FIG. 1 by means of a view broken open in the area of the helical spring 7. The counter disc 4 is a part of a magnet system including a magnet 10; the magnet is locked in a tension ring 11. In FIG. 1, the counter disc 4 is illustrated in the nonexcited state of the magnet 10. Upon initiation of the excitation of the electromagnet 10, the counter disc 4 is first withdrawn from the brake disc 3 toward the magnet 10 in the area of pilot pin 5 as shown in FIG. 3, since the lowest counterforce of the springs 7, 8, 9 occurs at this location. By means of this deflection of the counter disc 4 at one side, a significant reduction of the magnetic reluctance of the magnetic circuit proceeding over the counter disc 4 and the magnet 10 ensues, so that the excitation of the magnet 10 is sufficient with great security for the complete attraction of the counter disc 4 to the magnet 10.

As explained under the heading Summary of the Invention, the unsymmetrical force configuration of the spring device can be particularly simply realized from a structural point of view where the spring device is formed of at least three individual springs (such as 7, 8, and 9, FIG. 2) which are unsymmetrically distributed. Also, the spring device can be formed of symmetrically distributed individual springs of which at least one exhibits a smaller spring constant than the remaining individual springs; in such a spring device, the necessary asymmetry in the distribution of the spring power over the area of the counter disc (such as 4, FIG. 2) is produced by means of differing springs.

It will be apparent that many modifications and variations may be effected without departing from the scope of the novel concepts and teachings of the present invention.

I claim as my invention:

1. A braking system for a transport car for transporting files or goods of similar weight running on profile rails with traveling rollers, equipped with a drive motor fed via wiper contacts of current paths designed on the profile rails, said braking system comprising a brake disc secured to the motor shaft for rotation therewith, and a counter disc aligned for engagement with the brake disc, a spring device for urging the counter disc toward the braking disc to establish a braking condition, an electromagnet coupled with said counter disc and energizable for withdrawing the counter disc from the brake disc against the force of the spring device to release the braking condition, characterized in that the spring device (7, 8, 9) is of unsymmetrical force configuration such that, upon initiation of energization of the electromagnet in a first phase of the withdrawal of the counter disc (4), the counter disc (4) is more strongly withdrawn in the area of lower spring forces.

2. A braking system according to claim 1, characterized in that the spring device (7, 8, 9) is formed of at least three unsymmetrically distributed individual springs.

3. A braking system according to claim 2, characterized in that the individual springs (7, 8, 9) are designed as helical springs.

4. A braking system according to claim 1, characterized in that the unsymmetrical force configuration of the spring device is formed of symmetrically distributed individual springs of which at least one exhibits a lower spring constant than the remaining individual springs.

* * * * *